(12) United States Patent
Allen

(10) Patent No.: US 11,522,347 B2
(45) Date of Patent: Dec. 6, 2022

(54) METHOD OF MAKING AN INNERDUCT FOR A CONDUIT

(71) Applicant: WESCO Distribution, Inc., Pittsburgh, PA (US)

(72) Inventor: Jerry L. Allen, Sarasota, FL (US)

(73) Assignee: WESCO Distribution, Inc., Pittsburgh, PA (US)

( * ) Notice: Subject to any disclaimer, the term of this patent is extended or adjusted under 35 U.S.C. 154(b) by 805 days.

(21) Appl. No.: 16/435,804

(22) Filed: Jun. 10, 2019

(65) Prior Publication Data

US 2019/0379185 A1    Dec. 12, 2019

Related U.S. Application Data

(60) Provisional application No. 62/683,755, filed on Jun. 12, 2018.

(51) Int. Cl.
| | |
|---|---|
| *H02G 1/00* | (2006.01) |
| *H02G 3/04* | (2006.01) |
| *H02G 9/06* | (2006.01) |
| *D06N 3/00* | (2006.01) |

(52) U.S. Cl.
CPC ............ *H02G 1/00* (2013.01); *D06N 3/007* (2013.01); *H02G 9/06* (2013.01)

(58) Field of Classification Search
CPC .. H02G 3/04; H02G 9/06; H02G 1/00; H02G 3/0462; H02G 3/0487; G02B 6/44; G02B 6/4459; G02B 6/50; D06N 3/007; D03D 13/00; D03D 13/004; D03D 15/12
USPC ....... 174/68.1, 68.3, 72 R, 72 A, 74 R, 88 R, 174/70 C, 95, 96; 139/389, 383 R, 139/384 R; 156/227; 248/49, 68.1
See application file for complete search history.

(56) References Cited

U.S. PATENT DOCUMENTS

| | | | |
|---|---|---|---|
| 6,251,201 B1 * | 6/2001 | Allen ................. | H02G 1/08 174/68.1 |
| 6,262,371 B1 | 7/2001 | Allen | |
| 6,304,698 B1 * | 10/2001 | Morris ............... | H02G 3/0481 174/95 |
| 6,398,190 B1 * | 6/2002 | Li ...................... | H02G 1/08 385/147 |
| 6,571,833 B1 * | 6/2003 | McLarty, III ...... | H02G 9/06 174/95 |
| 6,718,100 B2 * | 4/2004 | Morris ............... | H02G 9/06 174/95 |
| 7,078,615 B2 * | 7/2006 | Gladfelter .......... | H02G 3/0487 174/36 |

(Continued)

FOREIGN PATENT DOCUMENTS

DE    20201504 U1    5/2002

OTHER PUBLICATIONS

WIPO, ISR & Written Opinion for International application No. PCT/US2019/036450 dated Aug. 13, 2019.

*Primary Examiner* — Angel R Estrada
(74) *Attorney, Agent, or Firm* — Renner, Kenner, Greive, Bobak, Taylor & Weber

(57) ABSTRACT

A method of fabricating a multi-compartment innerduct includes the steps of positioning a plurality of longitudinally extending, laterally spaced, strips of adhesive on a longitudinally extending sheet of fabric material, connecting adjacent of the strips together to form compartments, and attaching the compartments together.

8 Claims, 2 Drawing Sheets

(56) References Cited

U.S. PATENT DOCUMENTS

| | | | | |
|---|---|---|---|---|
| 7,799,997 B2* | 9/2010 | Bedingfield | ......... | G02B 6/4459 |
| | | | | 174/93 |
| 8,809,682 B2* | 8/2014 | Hepfinger | .............. | H02G 9/065 |
| | | | | 174/95 |
| 10,870,931 B2* | 12/2020 | Morris | ................. | D03D 13/004 |
| 2012/0132309 A1 | 5/2012 | Morris | | |
| 2017/0145603 A1 | 5/2017 | Bedingfield et al. | | |

\* cited by examiner

METHOD OF MAKING AN INNERDUCT FOR A CONDUIT

CROSS-REFERENCE TO RELATED APPLICATION

This application claims priority from U.S. Provisional Patent Application Ser. No. 62/683,755 filed on Jun. 12, 2018, which is incorporated herein by reference.

TECHNICAL FIELD

This invention relates to a method of making an innerduct for a communications conduit. More particularly, this invention relates to the use of an adhesive to attach fabric ducts together to form a multiple cell innerduct.

BACKGROUND ART

Positioning cables in underground communication conduits which extend for several thousand feet has long been a problem. Such is particularly true when it is desired to position an additional cable or cables into a conduit that already has a cable in it. That cable, particularly because of its plastic jacket, provides a great deal of friction to the new cable as it is being inserted into the conduit. As a result, the new or the existing cable may be damaged due to that friction. Such is particularly true when the cable in the conduit is ungulating which causes the cable being introduced to take a sinuous, fraction-laden path.

An extremely successful solution to this problem is a fabric innerduct sold under the trademark MAXCELL® by TVC Communications, LLC and shown in U.S. Pat. No. 6,262,371 which is incorporated herein by reference for whatever details may be necessary to understand the present invention. This innerduct is first positioned in a conduit and divides the conduit into longitudinally extending compartments. A cable can be positioned in one of the compartments, and a pull tape or rope can be positioned in another compartment which can later be utilized to pull a second cable into that compartment. Because there is fabric between the cables, the friction is not on the cable jacket but on the fabric which makes installation easier.

The compartments of these innerducts are typically connected to each other to provide a multi-compartment innerduct by stitching them together. While such a connection is normally sufficient, at times the stitching could come loose resulting in a possible loss of integrity of the compartments of the innerduct.

Thus, the need exists for an alternative manner in which to connect and form the compartments of an innerduct.

DISCLOSURE OF THE INVENTION

It is thus an object of one aspect of the present invention to fabricate a conduit innerduct without the use of stitching.

It is an object of another aspect of the present invention to fabricate an innerduct, as above, by using an adhesive.

These and other objects of the present invention, as well as the advantages thereof over existing prior art forms, which will become apparent from the description to follow, are accomplished by the improvements hereinafter described and claimed.

In general, a method of fabricating an innerduct includes the steps of positioning a plurality of longitudinally extending laterally spaced strips of adhesive on a longitudinally extending sheet of fabric material, and connecting at least two of the strips together to form at least one compartment.

A preferred method of fabricating an innderduct is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A sheet of a pliant material, preferably a low friction fabric material, is indicated generally by the numeral 10. The sheet of fabric 10 typically extends longitudinally for 2500 feet for example and the innerduct 11 (FIG. 4) made therefrom can be stored on a reel for use at a construction site where it would be installed in a conduit, typically found underground.

Figure 1:
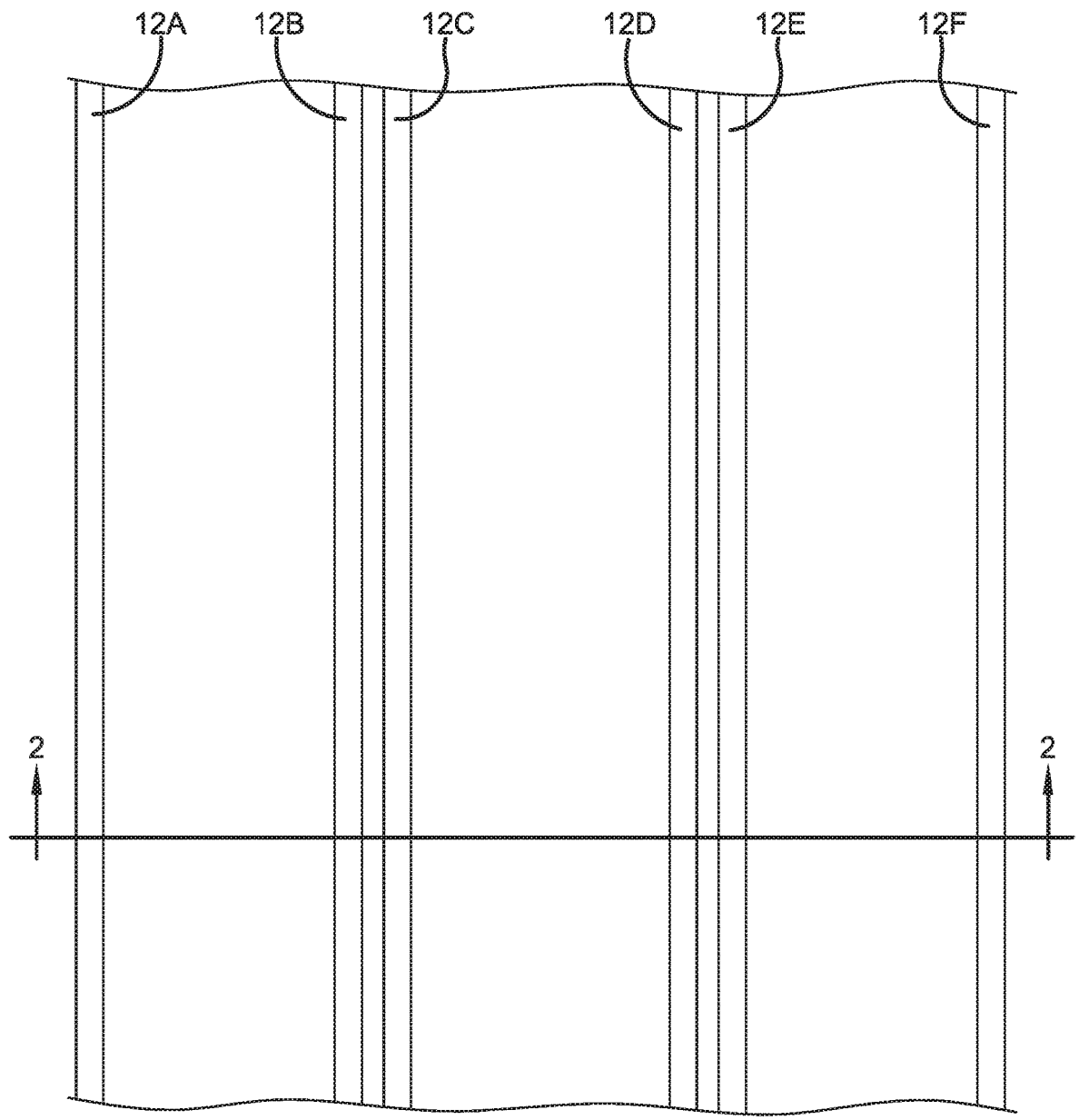
FIG. 1 is a fragmented top plan view of a fabric material used to make an innerduct.
Figure 2:
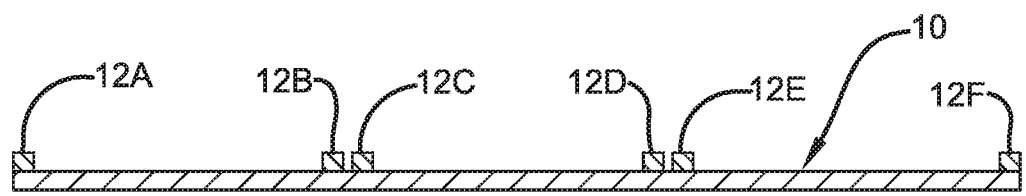
FIG. 2 is a somewhat schematic sectional view taken substantially along line 2-2 of FIG. 1.
Figure 3:
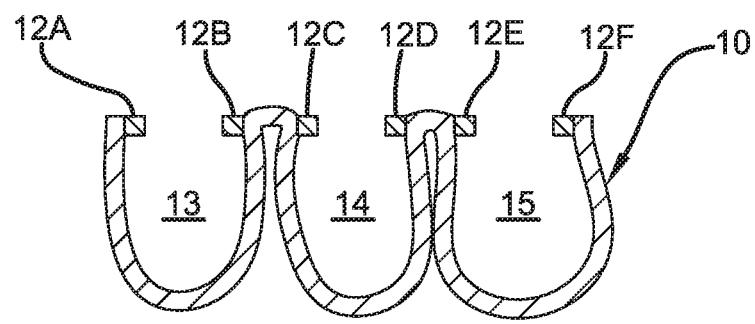
FIG. 3 is a somewhat schematic view of the fabric material of FIG. 2 having been folded in preparation for the formation of a multi-compartment innerduct.

If three innerduct compartments are to be provided, fabric sheet 10 would be provided with a plurality of laterally spaced, longitudinally extending, adhesive strips 12A, 12B, 12C, 12D, 12E and 12F. These strips 12 can be made of any suitable fabric adhesive, and are laterally positioned on sheet 10 so that when the sheet is folded, as schematically shown in FIG. 3, the strips 12 are at the top of potential innerduct compartments 13, 14 and 15. Thus, strips 12A and 12B are at the top of potential compartment 13, strips 12C and 12D are at the top of potential compartment 14, and strips 12E and 12F are at the top of potential compartment 15. Of course, more or less than three compartments can be formed by providing more or less strips of adhesive.

Figure 4:
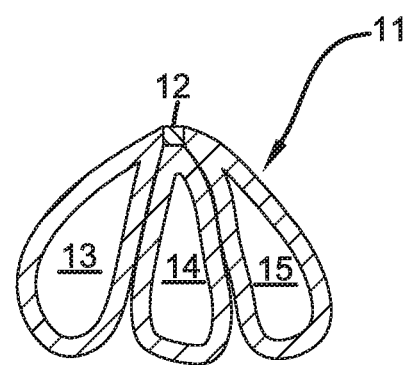
FIG. 4 is a somewhat schematic sectional view of the completed innerduct.

In order to construct the multi-compartment innerduct 11 shown in FIG. 4, the pair of strips 12A and 12B are attached to each other to form compartment 13, the pair of strips 12C and 12D are attached to each other to form compartment 14, and the pair of strips 12E and 12F are attached to each other to form compartment 15. All of the adhesive strips can also attached to each other, at 12 in FIG. 4, to form innerduct 11.

It is also contemplated by the invention that adhesive strips 12B, 12D and 12E could be eliminated with strips 12A, 12C and 12F being attached to each other to from compartments 13, 14 and 15 and thus innerduct 11.

It should thus be evident that an innerduct constructed as described herein substantially improves the art.

The invention claimed is:

1. A method of fabricating an innerduct comprising the steps of first positioning a plurality of longitudinally extending, laterally spaced, strips of adhesive on a longitudinally extending sheet of fabric material, and then folding the sheet of material so that adjacent strips of adhesive can be connected to form at least one compartment.

2. The method of claim 1 wherein the step of positioning includes the steps of positioning a first strip of adhesive at one lateral edge of the sheet of fabric material and positioning a second strip of adhesive at the other lateral edge of the sheet of fabric material, and wherein the step of folding the sheet of fabric material positions the first strip of adhesive and the second strip of adhesive adjacent to each other to be thereafter connected to form one compartment.

3. The method of claim 1 wherein the step of positioning includes the steps of positioning a first strip of adhesive at one lateral edge of the sheet of fabric material, positioning a second strip of adhesive on the sheet of fabric material adjacent to the first strip of adhesive, positioning a third strip of adhesive on the sheet of fabric material adjacent to the second strip of adhesive, and positioning a fourth strip of adhesive on the sheet of fabric material adjacent to the third strip of adhesive and at the other lateral edge of the sheet of fabric material, and wherein the step of folding includes the step of folding the sheet of fabric material so that the first strip of adhesive and the second strip of adhesive are adjacent to each other to be thereafter connected to form a first compartment, and the third strip of adhesive and the fourth strip of adhesive are adjacent to each other to be thereafter connected to form a second compartment.

4. The method of claim 3 further comprising the step of attaching the first strip of adhesive, the second strip of adhesive, the third strip of adhesive, and the fourth strip of adhesive together to thereby attach said first compartment and said second compartment.

5. The method of claim 1 wherein the step of positioning includes the steps of positioning a first strip of adhesive at one lateral edge of the sheet of fabric material, positioning a second strip of adhesive on the sheet of fabric material adjacent to the first strip of adhesive, positioning a third strip of adhesive on the sheet of fabric material adjacent to the second strip of adhesive, and positioning a fourth strip of adhesive on the sheet of fabric material adjacent to the third strip of adhesive, positioning a fifth strip of adhesive on the sheet of fabric material adjacent to the fourth strip of adhesive, and positioning a sixth strip of adhesive on the sheet of fabric material adjacent to the fifth strip of adhesive and at the other lateral edge of the sheet of fabric material, and wherein the step of folding includes the step of folding the sheet of fabric material so that the first strip of adhesive and the second strip of adhesive are adjacent to each other to be thereafter connected to form a first compartment, the third strip of adhesive and the fourth strip of adhesive are adjacent to each other to be thereafter connected to form a second compartment, and the fifth strip of adhesive and the sixth strip of adhesive are adjacent to each other to be thereafter connected to form a third compartment.

6. The method of claim 5 further comprising the step of attaching the first strip of adhesive, the, second strip of adhesive, the third strip of adhesive, the fourth strip of adhesive, the fifth strip of adhesive, and the sixth strip of adhesive together to thereby attach said first compartment, said second compartment, and said third compartment together.

7. The method of claim 1 wherein the step of positioning includes the step of positioning a first pair of laterally spaced strips of adhesive adjacent to a second pair of laterally spaced strips of adhesive, and further comprising the step of attaching the first pair of laterally spaced strips of adhesive to each other, attaching the second pair of laterally spaced strips of adhesive to each other, and attaching the first pair of laterally spaced strips of adhesive to the second pair of laterally spaced strips of adhesive.

8. The method of claim 7 wherein the step of positioning includes the step of positioning a third pair of laterally spaced strips of adhesive adjacent to the secured first and second pairs of laterally spaced strips of adhesive, and the step of attaching includes attaching the third pair of laterally spaced strips of adhesive to the first and second pairs of laterally spaced strips of adhesive.

\* \* \* \* \*